United States Patent
Lee et al.

(10) Patent No.: US 8,184,742 B2
(45) Date of Patent: May 22, 2012

(54) RF RECEIVER HAVING TIMING OFFSET RECOVERY FUNCTION AND TIMING OFFSET RECOVERY METHOD USING THEREOF

(75) Inventors: U Sang Lee, Gyunggi-do (KR); Jae Hyung Lee, Gyunggi-do (KR); Sang Ho Lee, Gyunggi-do (KR); Kwang Mook Lee, Gyunggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 933 days.

(21) Appl. No.: 12/137,463

(22) Filed: Jun. 11, 2008

(65) Prior Publication Data

US 2009/0168937 A1    Jul. 2, 2009

(30) Foreign Application Priority Data

Dec. 28, 2007    (KR) .......................... 10-2007-140715

(51) Int. Cl.
*H03K 9/00* (2006.01)
*H04L 27/00* (2006.01)

(52) U.S. Cl. ........ 375/316; 375/238; 375/239; 375/242; 375/256; 375/257; 375/286; 375/353; 455/130; 455/131; 455/132; 455/133; 455/134

(58) Field of Classification Search .................. 375/316
See application file for complete search history.

(56) References Cited

U.S. PATENT DOCUMENTS

| | | | | | |
|---|---|---|---|---|---|
| 4,237,537 | A | * | 12/1980 | Pitches et al. | 705/401 |
| 5,630,064 | A | * | 5/1997 | Ishibashi et al. | 340/10.2 |
| 6,601,078 | B1 | * | 7/2003 | Bondarowicz et al. | 708/422 |
| 2003/0123408 | A1 | * | 7/2003 | Saitou | 370/335 |
| 2004/0080636 | A1 | * | 4/2004 | Dong | 348/247 |
| 2007/0230591 | A1 | | 10/2007 | Choi et al. | |

* cited by examiner

*Primary Examiner* — Shuwang Liu
*Assistant Examiner* — Gina McKie
(74) *Attorney, Agent, or Firm* — Lowe, Hauptman, Ham & Berner, LLP

(57) ABSTRACT

A preprocessing unit samples and digitalizes analog signal. A differential operation unit delays digitalized signal for a predetermined period and differentiates delayed signals. A correlation unit correlates differentiated signal with a plurality of predetermined PN code sequences. A setting unit includes a shift register having a plurality of storage locations for shifting the correlation values and sequentially storing shifted correlation values at the storage locations, respectively, a detector including the determination slots for detecting the storage location of the maximum value, and a slot setter for comparing the storage location of the maximum value from the detector with the predetermined reference storage location and shifting the determination slots by the difference therebetween. A demodulation value estimation unit estimates, as a demodulation value of the received analog signal, a symbol of a PN code sequence corresponding to the maximum value from the shifted determination slots.

4 Claims, 4 Drawing Sheets

RF RECEIVER HAVING TIMING OFFSET RECOVERY FUNCTION AND TIMING OFFSET RECOVERY METHOD USING THEREOF

CROSS-REFERENCE TO RELATED APPLICATIONS

This application claims the priority of Korean Patent Application No. 2007-0140715 filed on Dec. 28, 2007, in the Korean Intellectual Property Office, the disclosure of which is incorporated herein by reference.

BACKGROUND OF THE INVENTION

1. Field of the Invention

The present invention relates to an RF receiver, and more particularly, to an RF receiver recovering timing offset by shifting determination slots in response to timing offset in response to when sampling a signal.

2. Description of the Related Art

Recently, a ubiquitous communication environment that allows users to access networks from anywhere at anytime has been proposed. A study on small-scale wireless communication systems, wireless personal area networks (WPAN), ubiquitous sensor networks (USN), radio frequency identification (RFID), and the like rather than cellular networks and large-scale communication networks, has been actively made.

Among the above-described communication systems, the WPAN and USN require a reduction in size, low cost, and low power consumption as well as communication performance. Therefore, it is difficult to directly apply high performance and high cost components used in the general cellular communication systems or the general wireless personal area networks to the above-described wireless communication systems.

On the other hand, when cheap components are used to reduce costs, great frequency error or phase error may occur. Therefore, there is a need to find out a solution to this problem.

Hereinafter, an RF receiver used in the wireless personal area network according to the related art will be described with reference to the accompanying drawing.

FIG. 1 is a configuration view illustrating an RF receiver used in a wireless personal area network according to the related art.

Referring to FIG. 1, an RF receiver 10 according to the related art includes a preprocessing unit 11, a differential operation unit 12, a correlation unit 13, and a demodulation value estimation unit 14. The preprocessing unit 11 samples and digitalizes an analog received signal. The differentiation unit 12 delays the digitalized received signal and differentiates the delayed signals. The correlation unit 13 correlates 16 code sequences with the differentiated signals and sequentially outputs correlation values. The demodulation value estimation unit 14 detects a maximum value among the correlation values and determines a PN code sequence corresponding to the detected maximum value as a symbol of the received signal.

In the above-described RF receiver 10 according to the related art, timing offset occurring when the analog received signal is sampled is reflected in output time of the correlation values. When the correlation values are sequentially output, the timing offset is continuously reflected in the correlation values. Therefore, the RF receiver 10 determines a wrong PN code sequence but not the PD code sequence corresponding to the maximum value as a symbol of the received signal according to the related art, which may cause a reception error.

SUMMARY OF THE INVENTION

An aspect of the present invention provides an RF receiver having a timing offset recovery function by shifting determination slots according to offset in a sample signal that occurs when the signal is sampled and a timing offset recovery method using the same.

According to an aspect of the present invention, there is provided an RF receiver having timing offset recovery function, the RF receiver including: a preprocessing unit sampling and digitalizing an analog received signal; a differential operation unit delaying the digitalized received signal from the preprocessing unit for predetermined periods of time and differentiating the delayed signals; a correlation unit correlating the differentiated received signals from the differential operation unit with a plurality of predetermined PN code sequences and sequentially outputting correlation values; a setting unit sequentially storing the correlation values from the correlation unit, detecting a maximum value among the stored correlation values, and shifting a plurality of determination slots by a difference between a storage location of the detected maximum value and a reference storage location; and a demodulation value estimation unit estimating as a demodulation value of the received signal, a symbol of a PN code sequence corresponding to the maximum value from the shifted determination slots.

The setting unit may include: a shift register storing a plurality of storage locations, shifting the correlation values from the correlation unit, and sequentially storing the shifted correlation values at the storage locations; a detector including the plurality of determination slots each of which takes charge of a number of storage locations of the plurality of storage locations and detecting a storage location of the maximum value among the correlation values from the plurality of determination slots; and a slot setter comparing the storage location of the maximum value from the detector with the predetermined reference storage location and shifting the determination slots by a difference therebetween.

The number of storage locations of the shift register may be determined according to the sampling frequency of the preprocessing unit.

According to an aspect of the present invention, there is provided a timing offset recovery method using an RF receiver, the method including: sampling and digitalizing an analog received signal; delaying the digitalized received signal for predetermined periods of time and differentiating the delayed received signals; correlating the differentiated received signals with a plurality of predetermined PN code sequences and sequentially outputting correlation values; sequentially storing the correlation values and detecting a maximum value among the stored correlation values to shift a plurality of determination slots by a difference between a storage location of the detected maximum value with a predetermined reference storage location; and estimating as a demodulation value of the received signal, a symbol of a PN code sequence corresponding to the maximum value from the shifted determination slots.

The shifting determination slots may include: shifting the correlation values from the correlation unit and sequentially storing the shifted correlation values in a shift register including a plurality of storage locations; detecting the storage location of the maximum value among the correlation values from the plurality of determination slots each of which takes charge of a number of storage locations of the plurality of storage locations; and comparing the storage location of the maximum value with the predetermined reference storage location and shifting the determination slots by a difference therebetween.

The number of storage locations of the shift register may be determined according to the sampling frequency of the analog received signal.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
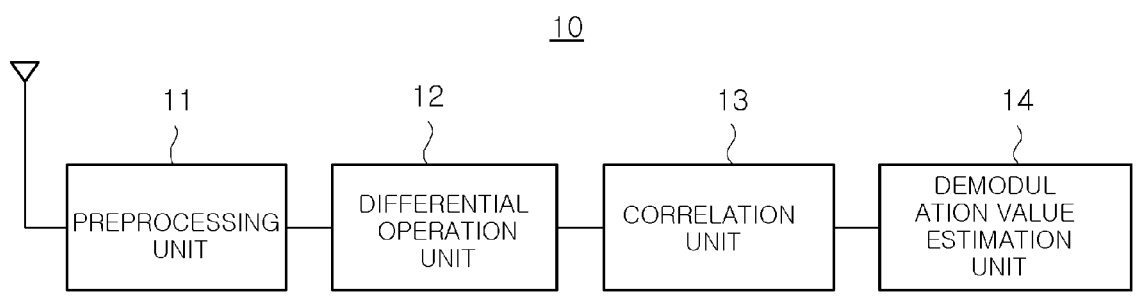
FIG. 1 is a configuration view illustrating an RF receiver according to the related art.
Figure 2:
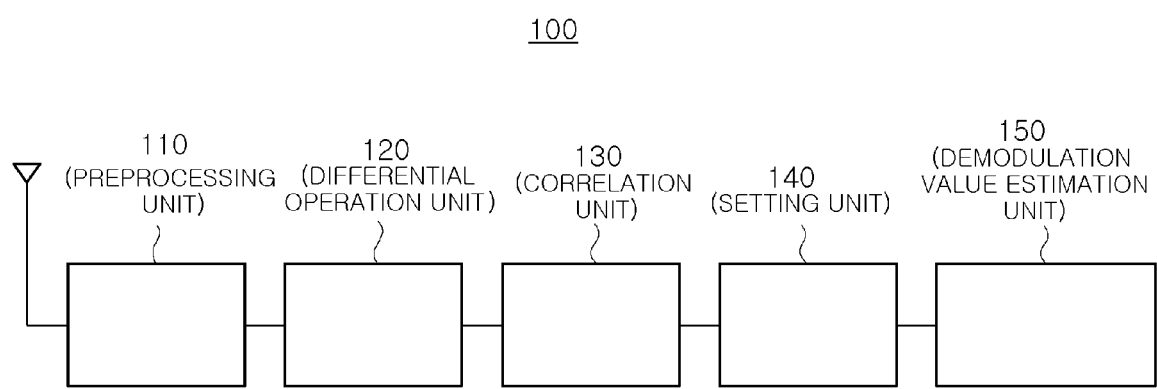
FIG. 2 is a configuration view illustrating an RF receiver according to an exemplary embodiment of the present invention.

FIG. 2 is a configuration view illustrating an RF receiver according to an exemplary embodiment of the invention.

Referring to FIG. 2, an RF receiver 100 according to an embodiment of the invention may include a preprocessing unit 110, a differential operation unit 120, a correlation unit 130, a setting unit 140, and a demodulation value estimation unit 150.

The preprocessing unit 110 receives an RF signal from an antenna according to a predetermined frequency and converts the RF signal into a digital signal. Here, the digital signal may be a base-band signal obtained by converting the RF signal into an IF signal and sampling the IF signal according to the frequency.

The differential operation unit 120 delays the digital signal from the preprocessing unit 110 for predetermined periods of time and multiplies the delayed signals by a currently received signal to obtain differentiated received signals.

The correlation unit 130 correlates the differentiated received signals from the differential operation unit 120 with a plurality of PN code sequences and sequentially outputs correlation values. The correlation unit 130 calculates symbol synchronization and packet synchronization by using the received signal differentiated by a minimum delay amount among the differentiated received signals from the differential operation unit 120 to determine a correction time.

The setting unit 140 sequentially stores the correlation values from the correlation unit 130, detects a maximum value among the stored correlation values, compares a storage location of the detected maximum value with a predetermined reference storage location, and shifts a determination slot by a difference therebetween, thereby recovering the timing offset occurring during the sampling operation.

The demodulation value estimation unit 150 estimates as a symbol of the received signal, the PN code sequence corresponding to the maximum correlation value detected by the setting unit 140.

Hereinafter, the setting unit 140 will be described in detail with reference to FIG. 3.

Figure 3:
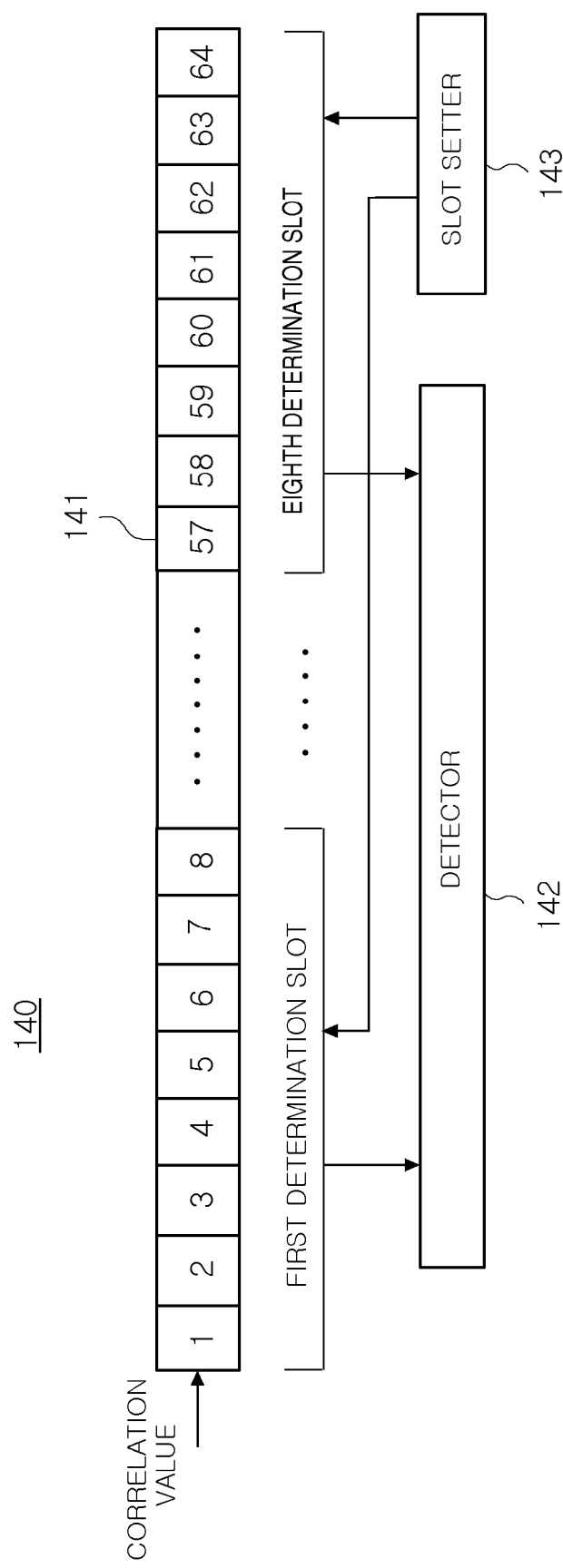
FIG. 3 is a detailed configuration view illustrating a setting unit used in the RF receiver according to the exemplary embodiment of the present invention.

FIG. 3 is a detailed configuration view illustrating the setting unit 140 used in the RF receiver 100 according to the embodiment of the present invention.

Referring to FIG. 3, the setting unit 140 includes a shift register 141, a detector 142, and a slot setter 143.

The shift register 141 has a plurality of predetermined storage locations. The shift resistor 141 sequentially shifts the correlation values from the correlation unit 130 to the right and stores the shifted correlation values at the storage locations.

The detector 142 includes a plurality of determination slots each of which takes charge of a number of storage locations of the plurality of storage locations of the shift register 141 and detects the maximum correlation value among the correlation values.

For example, when the shift register 141 has 64 storage locations from a first storage location to a sixty-fourth storage location according to the sampling frequency of the preprocessing unit 110, one determination slot takes charge of eight storage locations, and thus there may be eight determination slots.

The slot setter 143 compares the storage location of the maximum value detected by the detector 142 with a predetermined reference storage location and shifts the determination slot according to a difference therebetween.

Hereinafter, the operation and effect of the present invention will be described in detail.

Figure 4:
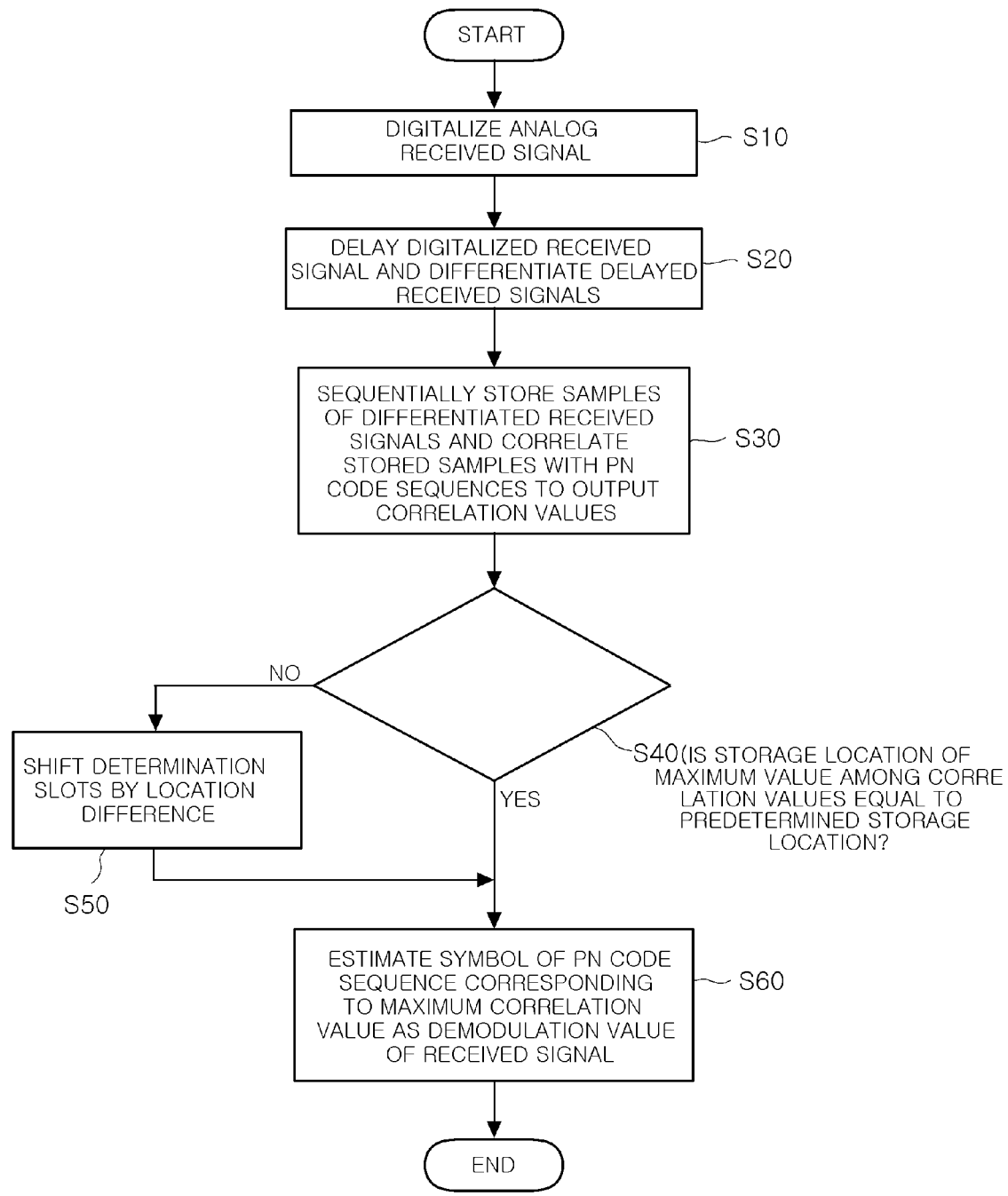
FIG. 4 is a flowchart illustrating a timing offset recovery method according to another exemplary embodiment of the present invention.

FIG. 4 is a flowchart illustrating a method of recovering timing offset according to another exemplary embodiment of the present invention.

Referring to FIGS. 2, 3, and 4, an analog received signal is sampled according to a predetermined frequency and digitalized by the preprocessing unit 110 (S10).

Then, the digitalized received signal is transmitted to the differential operation unit 120. The differential operation unit 120 delays the digitalized received signal for predetermined periods of time and multiplies the delayed signals by a received signal currently transmitted from the preprocessing unit 110 to differentiate the delayed received signals (S20).

Then, the differentiated received signals are transmitted to the correlation unit 130, and the correlation unit 130 sequentially stores samples of the differentiated received signals with a plurality of PN code sequences, correlates the stored samples with the plurality of PN codes sequences, and sequentially outputs the correlation values (S30). When the RF receiver according to the embodiment of the invention is applied to Zigbee, the plurality of PN code sequences may be 16 PN code sequences.

The sequentially output correlation values are transmitted to the setting unit 140. The setting unit 140 shifts the sequentially output correlation values to the right and sequentially stores the shifted correlation values in the shift register 141 having the plurality of storage locations. The number of storage locations of the shift register 141 is determined according to the sampling frequency of the preprocessing unit 110. When the RF receiver 100 according to the embodiment of the invention is applied to Zigbee, the shift register 141 may have 64 storage locations.

The detector 142 includes the plurality of determination slots each of which takes charge of a number of storage locations of the plurality of storage locations of the shift register 141. The RF receiver according to the embodiment of the invention may set eight determination slots. Each of the determination slots may take charge of eight determination slots. That is, the first determination slot may take charge of first to eighth storage locations, and the second determination slot may take charge of ninth to sixteenth storage locations. In the same manner, the storage locations of the third to eighth determination slots can be set.

Then, the detector 142 detects the maximum value among the correlation values storage stored at the storage locations of the shift register 141.

Then, the slot setter 143 determines whether the storage location of the maximum value detected by the detector 142 is equal to a predetermined storage location (S40), and shifts the determination slot by a distance therebetween (S50).

That is, when the maximum value is detected in the first determination slot, the storage location of the maximum value should be at the fourth or fifth storage location when there is no timing offset. However, when the timing offset occurs, the storage location of the maximum value may be at the second storage location, the seventh storage location, or any storage location, but not the fourth or fifth storage location. Therefore, the slot setter 143 determines the fourth or fifth storage location as a reference storage location and shifts the determination slot by a distance between the storage location of the detected maximum value and the reference storage location. For example, when the maximum correlation value is detected at the third storage location in the first determination slot, the storage locations that are taken charge of by the first determination slot may be shifted from the first to eight storage locations to sixty-fourth to seventh storage locations. Therefore, the storage location of the maximum value is shifted to the reference storage location. Therefore, even though timing offset occurs, the determination slots are shifted to recover the timing offset and prevent generation of an error.

The demodulation value estimation unit 150 estimates a symbol of the PN code sequence corresponding to the detected maximum value as a demodulation value of the received signal. That is, the PN code sequence includes 16 symbols. Each of the first to eighth symbols and each of the ninth to sixteenth symbols are applied to a determination slot in which the maximum value is detected. A symbol may be estimated as a demodulation value according to the sign + or − of the maximum value.

For example, when the maximum value is detected in the first determination slot, the first and ninth symbols are applied. Here, when the maximum value is positive (+), the first symbol may be estimated as a demodulation value of the received signal, and when the maximum value is negative (−), the ninth symbol may be estimated as a demodulation value of the received signal.

As set forth above, according to the exemplary embodiments of the invention, it is possible to accurately demodulate a received signal by determining an accurate symbol of the received signal without using an additional complex circuit by shifting determination slots according to offset in a sample signal, which occurs when the signal is sampled, to recover the timing offset.

While the present invention has been shown and described in connection with the exemplary embodiments, it will be apparent to those skilled in the art that modifications and variations can be made without departing from the spirit and scope of the invention as defined by the appended claims.

What is claimed is:

1. A Radio Frequency (RF) receiver having a timing offset recovery function, the RF receiver comprising:
    a preprocessing unit for sampling and digitalizing a received analog signal;
    a differential operation unit for delaying the digitalized signal received from the preprocessing unit for a predetermined period and differentiating the delayed signal;
    a correlation unit for correlating the differentiated signal received from the differential operation unit with a plurality of predetermined pseudo noise (PN) code sequences, and sequentially outputting correlation values;
    a setting unit for sequentially storing the correlation values, detecting a maximum value among the stored correlation values, and shifting a plurality of determination slots by a difference between a storage location of the detected maximum value and a predetermined reference storage location; and
    a demodulation value estimation unit for estimating, as a demodulation value of the received analog signal, a symbol of a PN code sequence corresponding to the maximum value from the shifted determination slots, wherein the setting unit comprises:
    a shift register having a plurality of storage locations including the storage location of the detected maximum value, for shifting the correlation values and sequentially storing the shifted correlation values at the storage locations, respectively;
    a detector including the determination slots, each of which is allocated for one or more of the storage locations, for detecting the storage location of the maximum value; and
    a slot setter for comparing the storage location of the maximum value from the detector with the predetermined reference storage location and shifting the determination slots by the difference therebetween.

2. The RF receiver of claim 1, wherein a number of the storage locations of the shift register is determined according to a sampling frequency of the preprocessing unit.

3. A timing offset recovery method using a Radio Frequency (RF) receiver, the method comprising:
    sampling and digitalizing a received analog signal;
    delaying the digitalized signal for a predetermined period, and differentiating the delayed signal;
    correlating the differentiated signal with a plurality of predetermined pseudo noise (PN) code sequences and sequentially generating correlation values;
    sequentially storing the correlation values, detecting a maximum value among the stored correlation values, and shifting a plurality of determination slots by a difference between a storage location of the detected maximum value with a predetermined reference storage location; and
    estimating, as a demodulation value of the received analog signal, a symbol of a PN code sequence corresponding to the maximum value from the shifted determination slots, wherein
    the shifting of the determination slots comprises:
    shifting the correlation values and sequentially storing the shifted correlation values in a shift register including a plurality of storage locations including the storage location of the detected maximum value;
    detecting the storage location of the maximum value, which is allocated for one or more of the storage locations; and
    comparing the storage location of the maximum value with the predetermined reference storage location and shifting the determination slots by the difference therebetween.

4. The method of claim 3, wherein a number of the storage locations of the shift register is determined according to a sampling frequency of the analog received signal.

* * * * *